(12) United States Patent
Hu

(10) Patent No.: US 6,246,542 B1
(45) Date of Patent: Jun. 12, 2001

(54) SINGLE MAGNETIC TAPE REEL WITH DUAL-SIDED RECORDING CAPABILITY

(75) Inventor: Paul Y. Hu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/366,101

(22) Filed: Aug. 2, 1999

(51) Int. Cl.$^7$ .................................................. G11B 23/107
(52) U.S. Cl. ........................................................... 360/132
(58) Field of Search ................. 360/132; 242/348–348.3

(56) References Cited

U.S. PATENT DOCUMENTS

| | | | |
|---|---|---|---|
| 3,974,975 | 8/1976 | Holmes | 242/55.19 |
| 4,000,519 | 12/1976 | Turk | 360/132 |
| 4,924,338 | * 5/1990 | Stacey | 360/132 |
| 5,906,324 | * 5/1999 | Adams et al. | 242/332.8 |
| 5,963,395 | * 10/1999 | Rudi | 360/96.1 |
| 5,979,814 | * 11/1999 | Childers | 242/347.1 |

FOREIGN PATENT DOCUMENTS 53-144710A    12/1978    (JP) .

* cited by examiner

Primary Examiner—Jefferson Evans
(74) Attorney, Agent, or Firm—Robert B. Martin; Bracewell & Patterson L.L.P.

(57) ABSTRACT

A magnetic media tape cartridge has a housing with a spool of magnetic tape wound on the spool. The tape is two-sided so that information can be recorded on both sides. The sides of the tape maintain an orthogonal planar orientation relative to the axis of the spool at all times. The housing has separate openings for accessing each side of the tape. A leading end of the tape protrudes through a third opening in the housing for offloading the tape onto a take-up reel. A door is pivotally mounted to the housing at each of the first two openings for covering and uncovering each side of the tape. The tape cartridge also has an indicator for indicating which side of the tape is being recorded or accessed.

34 Claims, 2 Drawing Sheets

SINGLE MAGNETIC TAPE REEL WITH DUAL-SIDED RECORDING CAPABILITY

BACKGROUND OF THE INVENTION

1. Technical Field

This invention relates in general to data cartridges and in particular to a data cartridge of magnetically recorded tape with a single reel that is capable of recording on both sides of the tape.

2. Background Art

Data cartridges containing one or more spools of magnetic media tape are well known in the prior art. The data cartridges are typically mounted in a tape drive unit and the spools are rotated by a spindle motor at selected speeds by the tape drive unit. In some data cartridges, the magnetic tape is simply conveyed internally within the cartridge from one spool to another. In other data cartridges, the magnetic tape is spooled out of the cartridge and onto a take-up reel located on the drive unit. In either configuration, one side of the tape is usually read or written to by a magnetic head located adjacent to the cartridge.

In the prior art, attempts have been made to improve the efficiency of data cartridges. For example, in U.S. Pat. No. 4,000,519, a cassette of two-sided magnetic tape has two reels which circulate the tape within the cartridge. Both sides of the tape are accessed through a pair of oppositely-facing windows in the cassette. A similar design is disclosed in Japanese patent JP53-144710. In that patent, the two-sided magnetic tape of a cassette is drawn out of the cassette through two opposite openings so that both sides of the tape can be read and/or written to by the tape drive.

A third example is described in U.S. Pat. No. 3,974,975, where a cartridge tape has a single reel of two-sided magnetic tape, and two oppositely-facing tape access windows. Apparently, the reel winds and unwinds the tape at its outer tape diameter and inner hub diameter simultaneously to make use of the single reel. In order to access both sides of the tape, the tape is twisted 180 degrees at two different locations inside the cartridge. Although these designs are workable, an improved, more reliable data tape cartridge is desirable.

SUMMARY OF THE INVENTION

A magnetic media tape data cartridge has a housing with a spool of magnetic tape wound on the spool. The tape is two-sided so that information can be recorded on both sides. The sides of the tape maintain an orthogonal planar orientation relative to the axis of the spool at all times. The housing has separate openings for accessing each side of the tape. A leading end of the tape protrudes through a third opening in the housing for offloading the tape onto a take-up reel. A door is pivotally mounted to the housing at each of the first two openings for covering and uncovering each side of the tape. The tape cartridge also has an indicator for indicating which side of the tape is being recorded or accessed.

DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
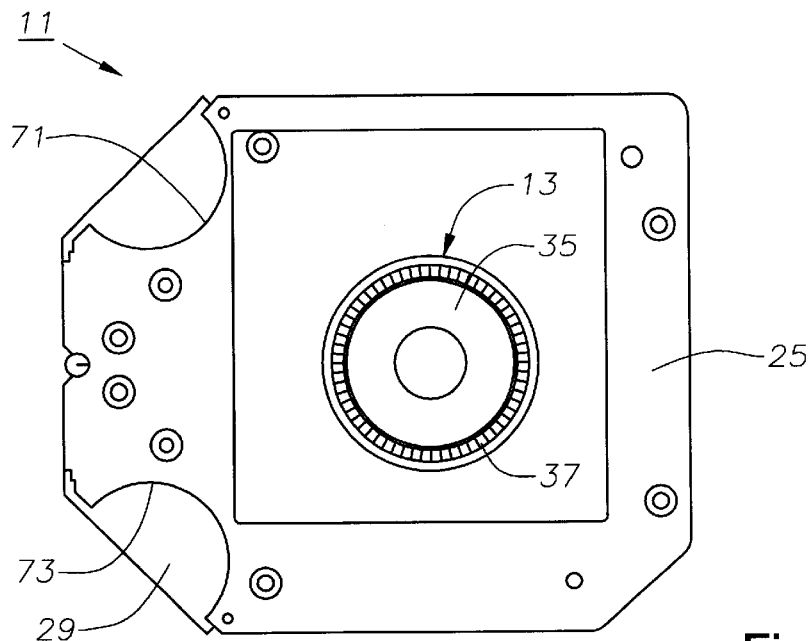
FIG. 1 is a side view of a magnetic tape cartridge that is constructed in accordance with the invention.
Figure 2:
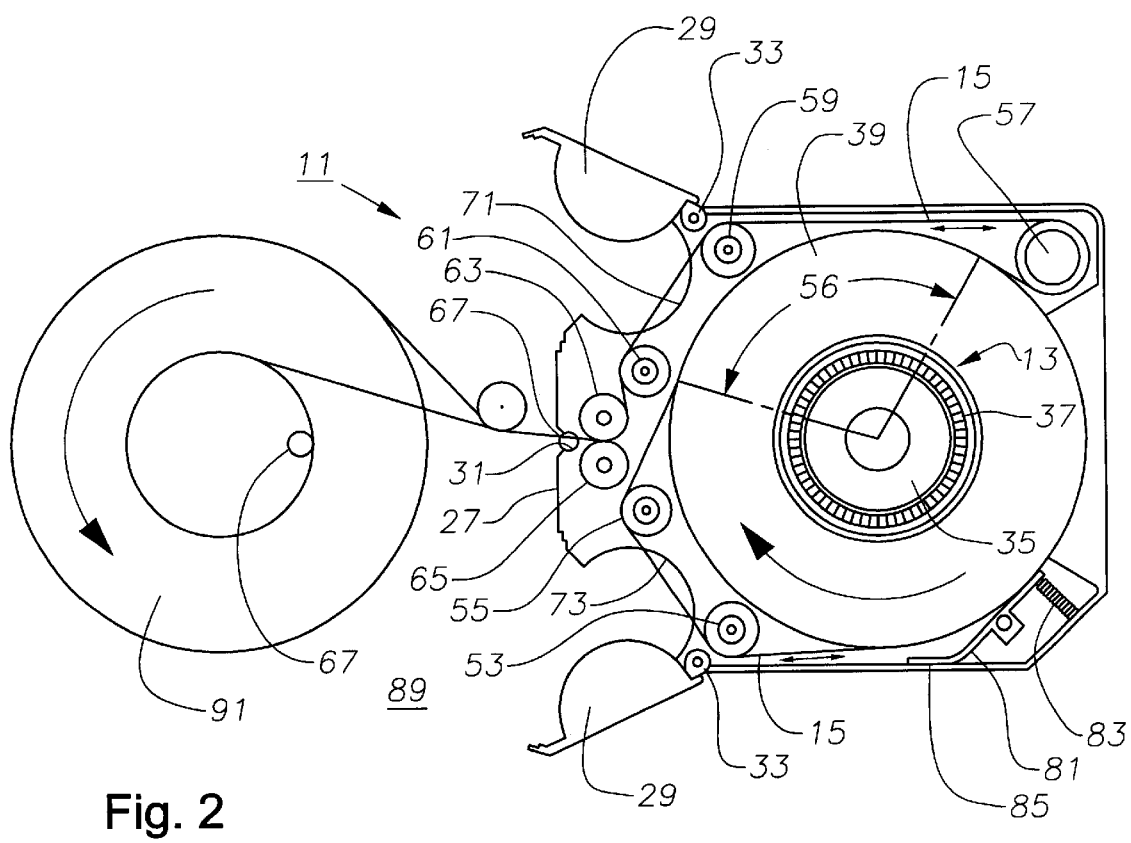
FIG. 2 is a sectional side view of the cartridge of FIG. 1 in operation with a take-up reel.
Figure 3:
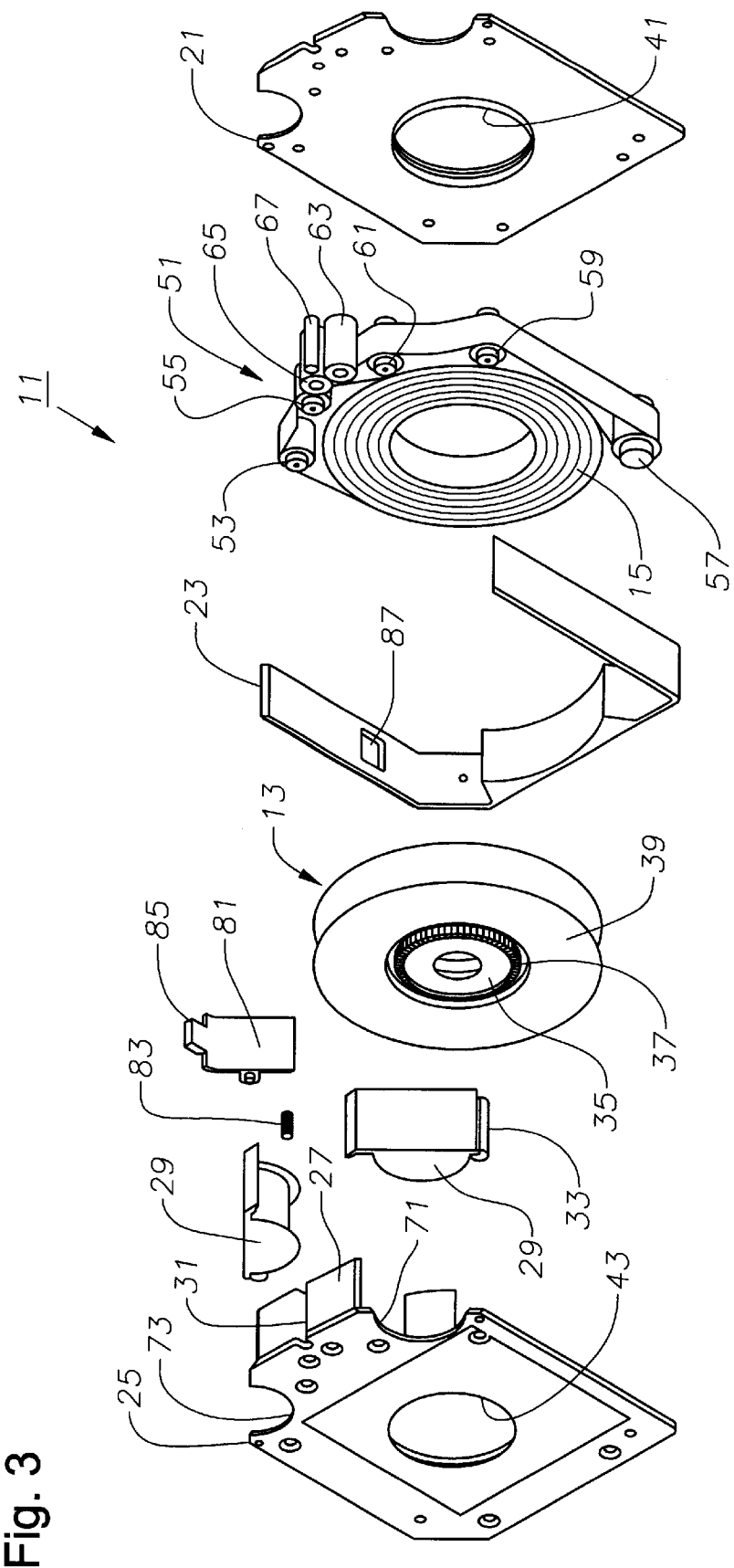
FIG. 3 is an exploded isometric view of the cartridge of FIG. 1.

Referring to FIGS. 1–3, a data cartridge 11 having a single reel 13 of double-sided, magnetic media tape 15 is shown. Reel 13 is rotatable relative to cartridge 11 but is otherwise substantially fixed from play or movement. Cartridge 11 is generally rectangular in shape and is configured to be loaded into conventional single-head tape drives or two-head tape drives. Cartridge 11 has an outer housing formed from an aluminum base plate 21 (FIG. 3), a lo cartridge side wall frame 23, and a cartridge top 25. These components are fastened together to form a rigid structure which protects the contents of cartridge 11.

Plate 21 and top 25 cover most of the broad surfaces of cartridge 11, and frame 23 covers three of the four side walls or edges of cartridge 11. The fourth edge of cartridge 11 is covered by a tape feed flange 27 on top 25, and a pair of cartridge covers or doors 29. Flange 27 is bisected by a slot 31 for allowing tape 15 to exit cartridge 11. Doors 29 are pivotally mounted between plate 21 and top 25 along pivot edges 33. Doors 29 are movable between closed positions (FIG. 1) and open positions (FIG. 2). In the preferred embodiment, doors 29 are biased to the closed position.

Reel 13 has a central, cylindrical hub 35 with hub gear teeth 37 on each of it sides. A pair of thin-walled flanges 39 radiate in parallel from hub 35. The gear teeth 37 on reel 13 are externally accessible on both sides of cartridge 11 by a tape drive motor (not shown) through holes 41, 43 in plate 21 and top 25, respectively. The two sets of teeth 37 allow cartridge 11 to be driven from either side. Cartridge 11 is symmetrical about an imaginary diametrical line extending along the centers of hub 35 and slot 31. This symmetry allows cartridge 11 to be inverted and used in different types of tape drives having one or two heads. Reel 13 is precisely positioned and held in place between shallow flanges at holes 41, 43 (FIG. 3) that engage recesses between hub 35 and flanges 39. The interface between reel 13 and cartridge 11 limits reel 13 to rotational movement relative to cartridge 11.

Data cartridge 11 has a tape path 51 that is defined by a plurality of rollers mounted between plate 21 and top 25. As shown at the bottom of FIG. 2, roller 53 of tape path 51 lifts tape 15 off and around the lower left circumferential edge of reel 13 and passes tape 15 to roller 55. Roller 55 allows tape 15 to re-engage the perimeter or circumferential edge of the roll of tape 15 and circulate with reel 13 as it continues to rotate over an arcuate span 56 of about 90 degrees. The overlap of tape 15 on reel 13 produces a "squeeze bearing effect:" that helps maintain tension in tape 15 at all times. The overlap also acts as a superior guiding mechanism that axially aligns the outer edges of the individual wraps of tape 15 during winding and unwinding.

Another roller 57 at the upper right of FIG. 2 re-lifts the articulated tape 15 off reel 13. It is at this point that tape 15 reverses direction and its inner surface is reoriented in a radially outward direction. Tape 15 moves toward a roller 59 that directs it toward a roller 61. Roller 61 then feeds tape 15 between two other rollers 63, 65 wherein it exits cartridge 11 through slot 31. The leading edge of tape 15 is attached to a leader block 67 which fits in slot 31 when cartridge 11 is not in use (FIG. 1). Note that tape path 51 briefly directs tape 15 outside cartridge 11 at the two cylindrical openings 71, 73 in FIG. 2. When doors 29 are open, tape 15 can be read or written to by the magnetic heads of the tape drive. Since tape path 51 reverses the direction of tape 15 within cartridge 11, both sides of tape 15 are accessible (e.g. read or written to) through openings 71, 73 by the tape drive.

Referring to FIGS. 2 and 3, cartridge 11 also has a brake 81 for decelerating reel 13 and/or preventing it from moving relative to cartridge 11. Brake 81 is an obtuse angled member that is pivotable between engaged (FIG. 2) and disengaged positions (not shown). Brake 81 is biased to the engaged position by a spring 83. Brake 81 has a brake button 85 that is externally accessible through a hole 87 in frame 23 (FIG. 3) by the tape drive for moving brake 81 to the disengaged position.

In operation, cartridge 11 is mounted in a tape drive 89 (FIG. 2) and leader block 67 is loaded onto a take-up reel 91 which rotates in the opposite direction to reel 13. Prior to loading, brake 81 is in the engaged position (FIG. 2) to prevent reel 13 from rotating and doors 29 are closed. Note that in the closed position, doors 29 depress or push the exposed portion of tape 15 radially inward to maintain slight tension therein. Once cartridge 11 is loaded in tape drive 89, brake 81 is automatically moved to the disengaged position so that reel 13 is free to rotate and doors 29 are pivoted open by tape drive 89. The two sets of gear teeth 37 on hub 35 allow cartridge to be driven from either or both sides. In addition, cartridge 11 is symmetrical about a line extending along the centers of hub 35 and slot 31. This symmetry allows openings 71, 73 of cartridge 11 to be inverted and used in different types of tape drives having one or two heads.

Tape drive 89 has a pair of magnetic heads which engage tape 15 at both openings 71, 73 in cartridge 11. Note that the outer surface or side of tape 15 is accessed through opening 73, and that the inner surface of tape 15 is accessed through opening 71. Tape path 51 inverts the orientation of tape 15 as it is circulated within cartridge 11 prior to tape 15 being deployed through slot 31 to take-up reel 91. The tension created in tape 15 while doors 29 were in the closed position is continued after they are opened when leader block 67 is deployed and loaded into the take-up reel 91. Tape 15 may be freely circulated in either direction between reel 13 and take-up reel 91 to position it at a desired location for data access. Cartridge 11 is removed by fully rewinding tape 15 onto reel 13 such that leader block 67 is released from take-up reel 89 and reseated in slot 31.

The invention has several advantages. The cartridge uses a single, one-half inch wide reel with magnetic tape that is capable of recording data on both sides of the tape. This configuration gives the cartridge a very small profile. The tape is wound onto the reel with squeeze bearing effect (two independent sets of bearings for guiding the tape). In addition, the tape has a staggered data track layout to maximize signal output and minimize noise. In azimuth recording, the data track on either side of the tape will be oriented in a different direction. The single-reel cartridge also has two openings with doors so that either side of the tape can be presented to a magnetic head. The tape comes out of the center of the cartridge instead of the side. This enables the invention to be threaded very quickly from the supply reel to the take-up reel, thereby significantly improving data access time.

While the invention has been shown or described in only some of its forms, it should be apparent to those skilled in the art that it is not so limited, but is susceptible to various changes without departing from the scope of the invention.

I claim:

1. A magnetic media tape cartridge, comprising:

a housing;

a single spool rotatably mounted within the housing;

magnetic media tape wound on the spool and having a trailing end mounted to the spool, a leader end, a first side, and a second side opposite to the first side;

a first opening in the housing for accessing the first side of the tape;

a second opening in the housing for accessing the second side of the tape;

a third opening in the housing for accessing the leader end of the tape; and wherein the leader end of the tape is adapted to be releasably attached to a take-up reel such that the tape may be removed from the housing and loaded on the take-up reel.

2. The tape cartridge of claim 1, further comprising a door mounted to the housing at each of the first and second openings, each of the doors having a closed position for covering the tape and the respective openings, and an open position for providing access to the tape.

3. The tape cartridge of claim 2 wherein each of the doors is pivotally mounted to the housing.

4. The tape cartridge of claim 1, further comprising a tape path assembly mounted to the housing and having a plurality of rollers for redirecting the tape to provide access to both sides of the tape through the first and second openings.

5. The tape cartridge of claim 4 wherein the tape path assembly has a first roller that lifts the tape off of the spool, and a second roller that allows the tape to re-engage the spool within the housing.

6. The tape cartridge of claim 1 wherein the housing comprises a top plate, a bottom plate, and a side wall frame mounted therebetween.

7. The tape cartridge of claim 1, further comprising a brake mounted between the housing and the spool for braking rotation of the spool.

8. The tape cartridge of claim 1 wherein the housing is is generally rectangular in shape and the first and second openings are located adjacent to one side of the housing.

9. The tape cartridge of claim 8 wherein the third opening is located between the first and second openings.

10. The tape cartridge of claim 1, further comprising an indicator on the housing for indicating which side of the tape is being recorded.

11. The tape cartridge of claim 1 wherein the first and second sides of the tape define a planar orientation that is substantially orthogonal to an axis of rotation of the spool at all times.

12. The tape cartridge of claim 1 wherein the cartridge is symmetrical about a diametrical line extending through the spool and the third opening, such that the cartridge is adapted to be inverted about the line in a tape drive and operable in either orientation.

13. The tape cartridge of claim 1 wherein the spool has two opposing outer surfaces and a set of gear teeth on each surface that are adapted to be driven by a tape drive.

14. A magnetic media tape cartridge, comprising:

a housing;

a single spool mounted within the housing and having an axis of rotation;

magnetic media tape wound on the spool and having a trailing end mounted to the spool, a leader end, a first side, and a second side opposite to the first side, wherein the first and second sides of the tape define a planar orientation that is substantially orthogonal to the axis of the spool at all times;

a first opening in the housing for accessing the first side of the tape; and a second opening in the housing for accessing the second side of the tape.

15. The tape cartridge of claim 14, further comprising a door pivotally mounted to the housing at each of the first and second openings, each of the doors having a closed position for covering the tape and the respective openings, and an open position for providing access to the tape.

16. The tape cartridge of claim 14, further comprising a tape path assembly mounted to the housing and having a plurality of rollers for redirecting the tape to provide access to both sides of the tape through the first and second openings.

17. The tape cartridge of claim 16 wherein the tape path assembly has a first roller that lifts the tape off of the spool, and a second roller that allows the tape to re-engage the spool within the housing.

18. The tape cartridge of claim 14 wherein the housing comprises a top plate, a bottom plate, and a side wall frame mounted therebetween.

19. The tape cartridge of claim 14, further comprising a brake mounted between the housing and the spool for braking rotation of the spool.

20. The tape cartridge of claim 14 wherein the housing is generally rectangular in shape and the first and second openings are located adjacent to one side of the housing.

21. The tape cartridge of claim 14, further comprising a third opening in the housing for accessing the leader end of the tape, and wherein the leader end of the tape is adapted to be attached to a take-up reel such that the tape may be offloaded from the spool to the take-up reel.

22. The tape cartridge of claim 21 wherein the third opening is located between the first and second openings.

23. The tape cartridge of claim 14, further comprising an indicator on the housing for indicating which side of the tape is being recorded.

24. The tape cartridge of claim 14 wherein the cartridge is symmetrical about a diametrical line extending through the axis of the spool and bisecting the first and second openings, such that the cartridge is adapted to be inverted about the line in a tape drive and operable in either orientation.

25. The tape cartridge of claim 14 wherein the spool has two opposing outer surfaces and a set of gear teeth on each surface that are adapted to be driven by a tape drive.

26. A magnetic media tape cartridge, comprising:

a housing;

a spool mounted to the housing and rotatable about an axis of rotation;

magnetic media tape wound on the spool and having a trailing end mounted to the spool, a leader end, a first side, and a second side opposite to the first side, wherein the first and second sides of the tape define a planar orientation that is substantially orthogonal to the axis of the spool at all times;

a first opening in the housing for accessing the first side of the tape;

a second opening in the housing for accessing the second side of the tape;

a third opening in the housing for accessing the leader end of the tape; and wherein
the leader end of the tape is adapted to be attached to a take-up reel such that the tape may be offloaded from the spool to the take-up reel.

27. The tape cartridge of claim 26, further comprising a door pivotally mounted to the housing at each of the first and second openings, each of the doors having a closed position for covering the tape and the respective openings, and an open position for providing access to the tape.

28. The tape cartridge of claim 26, further comprising a tape path assembly mounted to the housing and having a plurality of rollers for redirecting the tape to provide access to both sides of the tape through the first and second openings.

29. The tape cartridge of claim 28 wherein the tape path assembly has a first roller that lifts the tape off of the spool, and a second roller that allows the tape to re-engage the spool within the housing.

30. The tape cartridge of claim 26, further comprising a brake mounted between the housing and the spool for braking rotation of the spool.

31. The tape cartridge of claim 26 wherein the housing is generally rectangular in shape, the first and second openings are located adjacent to one side of the housing, and the third opening is located between the first and second openings.

32. The tape cartridge of claim 26, further comprising an indicator on the housing for indicating which side of the tape is being recorded.

33. The tape cartridge of claim 26 wherein the cartridge is symmetrical about a diametrical line extending through the axis of the spool and the third opening, such that the cartridge is adapted to be inverted about the line in a tape drive and operable in either orientation.

34. The tape cartridge of claim 26 wherein the spool has two opposing outer surfaces and a set of gear teeth on each surface that are adapted to be driven by a tape drive.

* * * * *